2,549,941

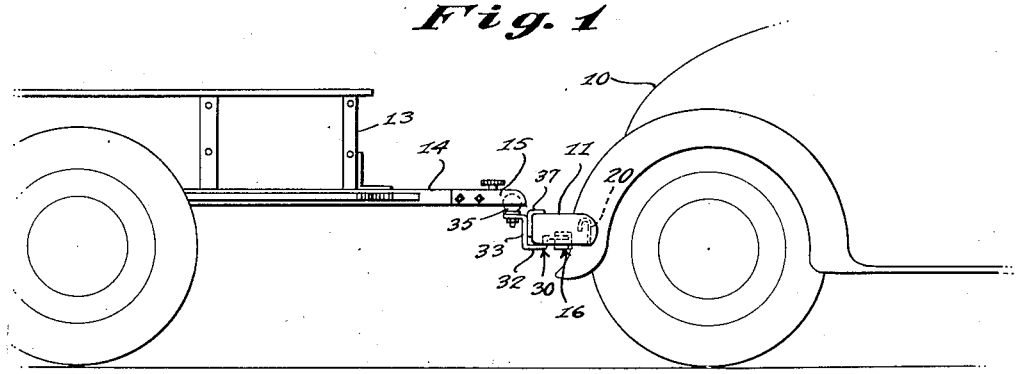
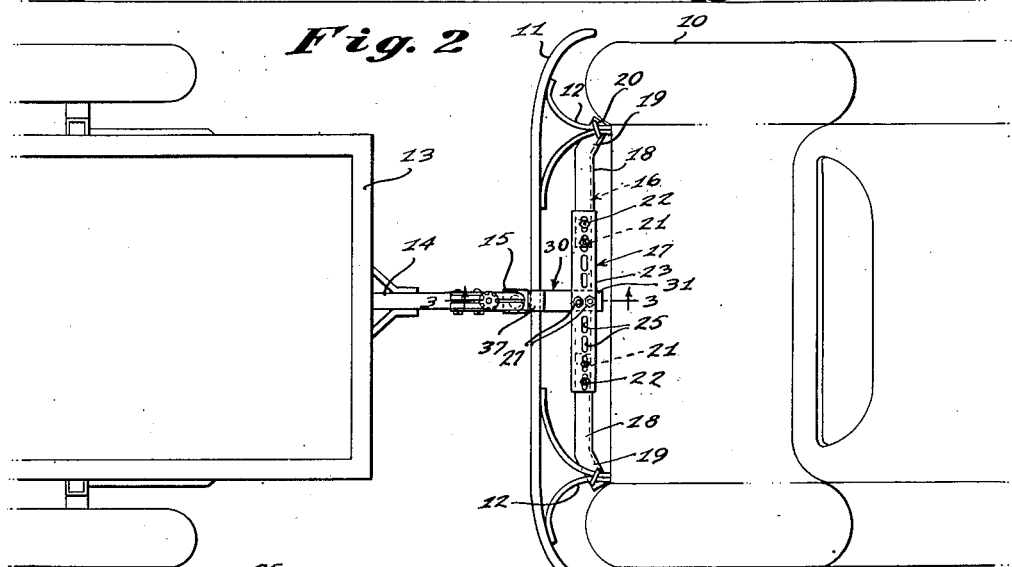
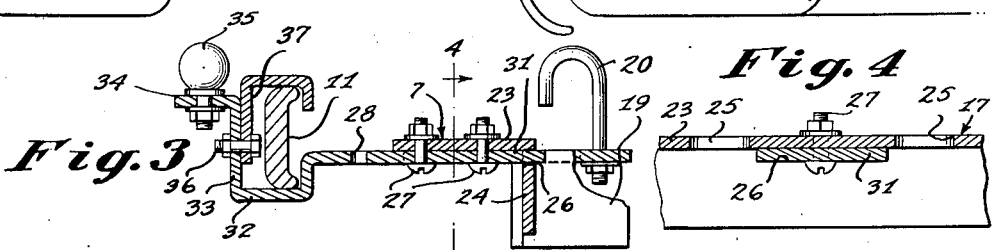
INVENTOR.
ARTHUR F. SMITH
BY
McMorrow, Berman & Davidson
ATTORNEYS Patented Apr. 24, 1951

UNITED STATES PATENT OFFICE 2,549,941

MOUNT FOR TRAILER HITCH

Arthur F. Smith, Trenton, N. J.

Application October 28, 1947, Serial No. 782,552

2 Claims. (Cl. 280—33.44)

My invention relates to mounts or brackets for detachably connecting a trailer hitch to a motor vehicle, and more particularly to such mounts as are detachably connected to the rear bumper brackets of a motor vehicle, whereby to relieve the bumper of the towing and other strains incident to the towing of a trailer.

As is well known, the rear bumpers of motor vehicles are frequently used as supports or mounts for trailer hitches. Obviously, such bumpers are not designed to stand the strains incident to such use, whereby when so used they create a considerable hazard. Indeed, such hazard is considered so great that at least one State at present forbids the mounting of trailer hitches directly to such rear bumpers.

With the foregoing in view, an object of my invention is to provide an improved mount for a trailer hitch, which mount is supported by the bumper brackets of the motor vehicle.

A further object is to provide an improved mount for a trailer hitch which is supported by the rear bumper brackets of a motor vehicle, and which includes means extending rearwardly of the bumper and mounting a trailer hitch thereon.

A further object is to provide an improved mounting means for a trailer hitch such as that last described which includes means partially encircling said rear bumper to steady said hitch and mount.

A further object is to provide an improved mount for a trailer hitch which is supported by the bumper brackets of a motor vehicle and which is adjustable to fit bumper brackets spaced apart varying distances.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is an elevation of a preferred form of mount according to the invention and showing the same applied to a motor vehicle and a trailer, the motor vehicle and trailer being shown fragmentarily;

Figure 2 is a plan view of Figure 1;

Figure 3 is a longitudinal vertical section on an enlarged scale and taken substantially on the plane of the line 3—3 of Figure 2;

Figure 4 is a transverse vertical section taken substantially on the plane of the line 4—4 of Figure 3;

Figure 5 is a plan view of a modified form of mount for a trailer hitch.

Referring specifically to the drawings, wherein like reference characters have been used throughout to designate like parts, 10 designates the rear end of an automobile provided with the usual rear bumper 11, which is rigidly connected to the frame of the automobile by the usual bumper brackets 12. A trailer 13 is provided with the usual tow bar 14, the forward end of which is a portion 15 adapted to be detachably secured to a vehicle-carried trailer hitch.

Referring specifically to the form of invention disclosed by Figures 1 to 4, inclusive, the mount according to this form of the invention comprises a bar member 16 which comprises a central bar 17 and substantially identical end bars 18 arranged together so that the inner ends of the end bars 18 are telescoped with the outer ends of the central bar 17. The outer ends of the end bars 18 are forwardly directed, as at 19, to facilitate the application of the bar member to the present-day streamline cars. Such end portions 19 are suitably provided with spaced apertures for the reception of the free ends of the legs of hook-bolts 20 which straddle the upper brackets 12, whereby to secure the bar member to such brackets below the same. Suitable lock washers and nuts applied to the free ends of the legs of the hook-bolts 20 secure the bar member in position. The inner ends of the end bars 18 are provided with longitudinally-spaced apertures for the reception of bolts or cap screws 22. Preferably the end bars and central bar are formed of material having an angular configuration, and at least the central bar 17 is formed to provide a horizontal flange 23 and a vertical flange 24, the vertical flange being extended from the front edge of the horizontal flange. The end portions of the horizontal flange of the central bar 17 are formed with a longitudinally-aligned series of slots 25 for the reception of the bolts or cap screws 22. It is obvious from the foregoing that upon loosening of the bolts or cap screws 22, the end bars 18 may be extended or retracted, whereby they may be fitted to bumper brackets spaced apart a varying distance.

The vertical flange 24 of the central bar 17 is formed with an elongated slot 26 which extends therethrough in the region of the horizontal flange 23, whereby an upper edge of such slot 26 is substantially flush with the under surface of the horizontal flange. The central portion of the horizontal flange 23 is formed with a plurality of apertures therethrough for the reception of bolts or cap screws 27.

A rearwardly-directed hitch member 30 includes a forwardly-extending bar portion 31 which is adjustable in the slot 26 of the vertical flange 24. Such bar portion 31 is provided with a plurality of longitudinally-aligned apertures 28 any pair of which may be positioned to receive the bolts or cap screws 27, whereby to provide means for adjustably and detachably securing such bar portion 31 to the bar member 16. Rearwardly of the bar portion 31, the hitch member 30 is downwardly offset, as at 32, to pass below the bumper 11. The downwardly-offset portion 32 merges into a vertical portion 33 which terminates in a rearwardly-extending, upwardly offset terminal portion 34. The terminal portion 34 has detachably secured thereto in any suitable manner a trailer hitch member 35. The vertical portion 33 of the rearward extension of the hitch member 30 has detachably secured thereto, as by means of a bolt or bolts 36, a substantially inverted L-shaped member or clamp 37. Such clamp 37 partially encircles the upper portion of the bumper 11 and comprises means for steadying the hitch member 30 against twisting strains, and is also operative to damp vertical vibration thereof. It is to be understood that the downwardly-offset portion 32, together with the clamp 37, is not intended to provide a mount for the trailer hitch 35, as all of the towing and like strains incident to towing the trailer 13 are borne by the hitch member 30 and bar member 16. However, in the event of a failure of the bolts 27 or the bar member 16, it is obvious that the offset portion 32 and clamp 37 will function as an emergency mount for the trailer hitch 35.

Referring to the modification disclosed in Figure 5, I have provided a bar member 60 which comprises one piece of material of angular configuration and having a depending vertical flange 63. The end portions 61 of the member 60 are forwardly directed for the purpose described aforesaid, and are suitably apertured for the insertion therein of hook-bolts 20 for attaching the free ends 61 to the bumper brackets 12 of the motor vehicle. The central portion 62 of the horizontal flange of the member 60 is formed with suitable apertures for the passage therethrough of the bolts 27 for attaching the bar portion 31 of the hitch member 30 thereto, as in the manner previously described. For this purpose the vertical flange 63 is formed with an elongated slot 64 to permit the passage of such bar portions 31 therethrough.

While I have shown what is now believed to be the preferred embodiments of my invention, it is obvious that the same is susceptible of other forms and expressions. Consequently, I do not limit myself to the precise structures shown and described hereinabove except as hereinafter claimed.

I claim:

1. A mount for a trailer hitch for an automobile having a rear bumper and laterally-spaced bumper brackets connecting said bumper thereto in rearwardly-spaced relation, said mount comprising a bar member adapted to extend between said brackets, means detachably connecting said bar member to said brackets, said bar member being of angular configuration in cross-section to provide horizontal and vertical flanges, a central portion of said vertical flange being formed with a slot therethrough, said slot being substantially flush with one surface of said horizontal flange, a rearwardly-directed hitch member including a bar portion longitudinally adjustable in said slot, means detachably connecting said bar portion to said horizontal flange, and a trailer hitch carried by said hitch member rearwardly of said bumper.

2. A mount for a trailer hitch for an automobile having a rear bumper and laterally-spaced bumper brackets connecting said bumper thereto in rearwardly-spaced relation, said mount comprising a bar member adapted to extend between said brackets, means detachably connecting said bar member to said brackets, said bar member being of angular configuration in cross-section to provide horizontal and vertical flanges, a central portion of said vertical flange being formed with a slot therethrough, said slot being substantially flush with one surface of said horizontal flange, a rearwardly-directed hitch member including a bar portion longitudinally adjustable in said slot, means detachably connecting said bar portion to said horizontal flange, said bar portion having a rear portion downwardly offset to pass below said bumper, an upwardly-offset terminal portion extending rearwardly of said bumper, a trailer hitch carried by said terminal portion, and a forwardly-extending clamp member carried by said terminal portion, said clamp member being formed to partially encircle upper portions of said bumper.

ARTHUR F. SMITH.

REFERENCES CITED

The following references are of record in the file of this patent:

UNITED STATES PATENTS

| Number | Name | Date |
|---|---|---|
| 2,097,006 | Weis | Oct. 26, 1937 |
| 2,268,181 | Bolton | Dec. 30, 1941 |
| 2,408,531 | Reimann et al. | Oct. 1, 1947 |